(12) United States Patent
Jung et al.

(10) Patent No.: US 12,737,839 B2
(45) Date of Patent: Sep. 15, 2026

(54) APPARATUS AND METHOD WITH NEURAL NETWORK OPERATION UPSAMPLING

(71) Applicants: SAMSUNG ELECTRONICS CO., LTD., Suwon-si (KR); Seoul National University R&DB Foundation, Seoul (KR)

(72) Inventors: Hanwoong Jung, Suwon-si (KR); Soonhoi Ha, Seoul (KR); Donghyun Kang, Suwon-si (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 249 days.

(21) Appl. No.: 18/524,062

(22) Filed: Nov. 30, 2023

(65) Prior Publication Data

US 2024/0221112 A1 Jul. 4, 2024

(30) Foreign Application Priority Data

Dec. 29, 2022 (KR) ........................ 10-2022-0189400

(51) Int. Cl.
*G06T 3/4046* (2024.01)

(52) U.S. Cl.
CPC .................................. *G06T 3/4046* (2013.01)

(58) Field of Classification Search
CPC ..... G06T 3/4046; G06T 3/4053; G06N 3/063; G06F 17/16
USPC .......................................................... 382/155
See application file for complete search history.

(56) References Cited

U.S. PATENT DOCUMENTS

2020/0349681 A1* 11/2020 Andrei .................... G06N 3/088
2020/0410352 A1 12/2020 Buckler et al.
2022/0405880 A1* 12/2022 Karras ...................... G06T 3/60
2022/0405881 A1* 12/2022 Lee ........................ G06T 3/4007
2022/0405980 A1* 12/2022 Karras ................ G06F 13/1668
2023/0237308 A1* 7/2023 Sakr ........................ G06N 3/063 706/25
2024/0013446 A1* 1/2024 Alshina ................ H04N 19/182
2024/0135489 A1* 4/2024 Liu ........................ G06T 3/4046
2024/0265232 A1* 8/2024 Crews ...................... G06F 17/15
(Continued)

FOREIGN PATENT DOCUMENTS

KR 10-2019-0132415 A 11/2019
KR 10-2342526 B1 12/2021
KR 10-2022-0030084 A 3/2022

OTHER PUBLICATIONS

Scale-Aware Dynamic Network for Continuous-Scale Super-Resolution, by Wu, Hanlin, Ni, Ning, Zhang, Libao, Arxiv ID: 2110.15655 Publication Date: Oct. 29, 2021 (Year: 2021).*

*Primary Examiner* — Jennifer Mehmood
*Assistant Examiner* — Heath E. Wells
(74) *Attorney, Agent, or Firm* — NSIP Law

(57) ABSTRACT

Neural network operation apparatus and method are provided. The neural network operation apparatus includes: one or more processors; and memory storing instructions configured to cause the one or more processors to: generate an upsampled tensor by copying pixels, of a unit of data, based on a scale factor for upsampling; and generate, based on the scale factor, a neural network operation result by performing a pooling operation on the upsampled tensor.

19 Claims, 7 Drawing Sheets

(56) References Cited

U.S. PATENT DOCUMENTS

2025/0254366 A1* 8/2025 Nguyen ............... H04N 19/119
2025/0310548 A1* 10/2025 Rosewarne ........... H04N 19/90

* cited by examiner

APPARATUS AND METHOD WITH NEURAL NETWORK OPERATION UPSAMPLING

CROSS-REFERENCE TO RELATED APPLICATIONS

This application claims the benefit under 35 USC § 119(a) of Korean Patent Application No. 10-2022-0189400, filed on Dec. 29, 2022, in the Korean Intellectual Property Office, the entire disclosure of which is incorporated herein by reference for all purposes.

BACKGROUND

1. Field

The following description relates to an apparatus and method with neural network upsampling.

2. Description of Related Art

Bilinear upsampling is a type of deconvolutional operation frequently used in deep learning applications such as image segmentation and object detection.

Bilinear upsampling is used to increase the size of a tensor of a feature map that has decreased from passing through a pooling layer or a convolution layer. For example, in the DeepLabv3 segmentation network, bilinear upsampling is performed twice at the latter part of the network, which may result in output data having the same size as initial input data.

Because bilinear upsampling is not usually taken into consideration when designing a hardware accelerator for efficiently performing neural network operations, bilinear upsampling operation is not supported by a general neural network accelerator or requires processing through an additional core.

However, if bilinear upsampling operation is processed through offloading or with an additional core, the processing may be inefficient since there may be a large load compared to the amount of overall computation. Moreover, even if bilinear upsampling is performed with a core that is capable of bilinear upsampling, the processing thereof may be inefficient since bilinear upsampling has comparatively large computational complexity because a computational kernel of bilinear upsampling is not fixed and a pixel to refer to varies.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a neural network operation apparatus includes: one or more processors; memory storing instructions configured to cause the one or more processors to: generate an upsampled tensor by copying pixels, of a unit of data, based on a scale factor for upsampling; and generate, based on the scale factor, a neural network operation result by performing a pooling operation on the upsampled tensor.

The unit of data may include a feature map in which the pixels are arranged in two dimensions.

The instructions may be further configured to cause the one or more processors to generate the upsampled tensor by copying the pixels such that a width or a height of the upsampled tensor is the scale factor times twice a width or a height of the unit of data.

The instructions may be further configured to cause the one or more processors to generate the upsampled tensor by referring to an address, in which the pixels are stored, and to do so for a number of times that is determined based on the scale factor.

The pooling operation may include an average pooling operation.

The instructions may be further configured to cause the one or more processors to determine, based on the scale factor, a kernel size of the pooling operation and a padding size of the pooling operation.

The instructions may be further configured to cause the one or more processors to determine the kernel size to be twice a value of the scale factor.

The instructions may be further configured to cause the one or more processors to determine the padding size to be a value obtained by subtracting "1" from the value of the scale factor.

The instructions may be further configured to cause the one or more processors to perform padding with a pixel, among the pixels, closest to a padding position and based on the padding size.

The neural network operation result may be a bilinear upsampling of the unit of data based on the scale factor.

In another general aspect, a neural network operation method includes: receiving data including pixels; generating an upsampled tensor by copying the pixels based on a scale factor for upsampling; and generating a neural network operation result by performing a pooling operation on the upsampled tensor.

The data may include a feature map in which the pixels are arranged in two dimensions.

The upsampled tensor may be generated by copying the pixels such a width or height of the upsampled tensor is the scale factor times twice the width or height of the data.

The upsampled tensor may be generated by referring to an address, in which the pixels are stored, and doing so for a number of times that is determined based on the scale factor.

The pooling operation may include an average pooling operation.

The generating of the neural network operation result may include determining a kernel size of the pooling operation and a padding size of the pooling operation.

The determining of the kernel size of the pooling operation and the padding size of the pooling operation may include determining the kernel size to be twice a value of the scale factor.

The determining of the kernel size of the pooling operation and the padding size of the pooling operation may include determining the padding size to be a value obtained by subtracting "1" from the value of the scale factor.

The generating of the neural network operation result may further include performing padding with a pixel, among the pixels, closest to a padding position based on the padding size.

The neural network operation result may be a bilinear upsampling of the data based on the scale factor.

Other features and aspects will be apparent from the following detailed description, the drawings, and the claims.

Figure 1:
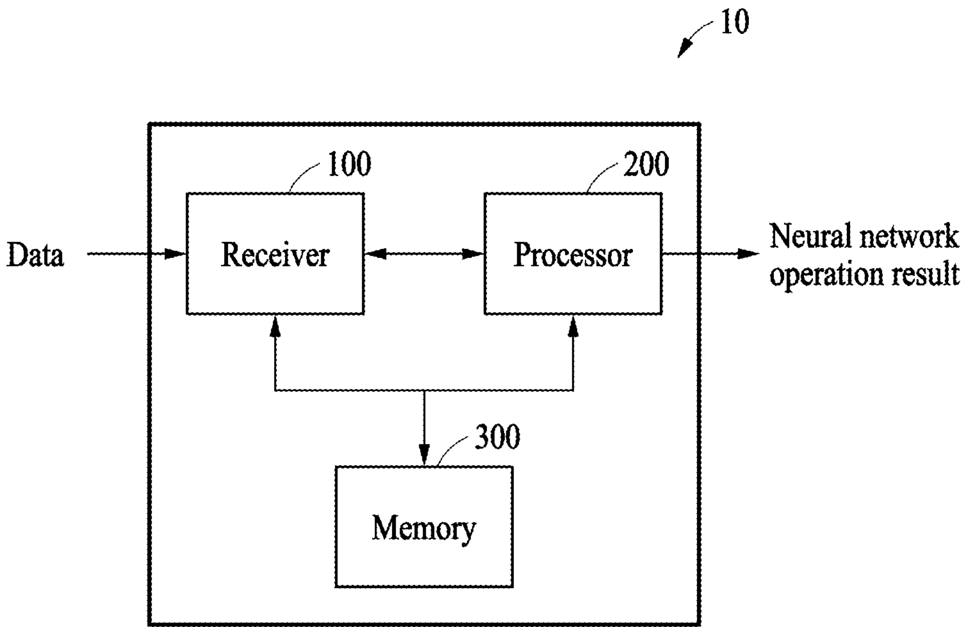
FIG. 1 illustrates an example neural network apparatus, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example neural network apparatus, according to one or more embodiments.

Referring to FIG. 1, a neural network apparatus 10 may perform a neural network operation. The neural network operation may include an operation involved in performing training or inference using a neural network.

The neural network may be an overall model in which a nodes that form a network by coupling (connections) therebetween. The neural network may have a problem-solving ability by changing the strength of the coupling (connections) through a learning process.

A node of the neural network may include a weighted combination of connections, and may have a bias. The neural network may include layers of nodes, and generally, with each layer's nodes (except an input layer) have connections to a preceding layer's nodes. The neural network may infer (predict) a result from an arbitrary input according to the weights of the connections, and the weights may be by changed through learning (training).

The neural network may be, for example, a deep neural network. The neural network may be, for example, a convolutional neural network (CNN), a recurrent neural network (RNN), a perceptron, a multilayer perceptron, a feed forward (FF) network, a radial basis network (RBN), a deep feed forward (DFF) network, a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), a binarized neural network (BNN), an attention network (AN), and/or the like.

The neural network apparatus 10 may be implemented in a personal computer (PC), a data server, or a portable device, for example.

In the case of a portable device, the neural network apparatus 10 may be implemented as a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal, or portable, navigation device (PND), a handheld game console, an e-book, or a smart device. The smart device may be implemented as a smart watch, a smart band, or a smart ring.

The neural network apparatus 10 may perform a neural network operation using an accelerator. The neural network apparatus 10 may be implemented inside or outside of the accelerator. The accelerator may be, for example, a graphics processing unit (GPU), and neural processing unit (NPU), an in-memory computing device (e.g., configured to perform multiply-and-accumulate operations on data stored therein), and so forth.

The neural network operation apparatus 10 may include a receiver 100 and a processor 200. The neural network operation apparatus 10 may further include a memory 300.

The receiver 100 may include a receiving interface. The receiver 100 may receive data. The data may include a plurality of pixels. The receiver 100 may receive data including a plurality of pixels. The data may include a feature map where the plurality of pixels is arranged in two dimensions (2D). The nature of the values of the pixels, e.g., from photographs, from rendered images, from synthetic image data, from feature maps, etc., is not significant.

The receiver 100 may receive data from outside, from the memory 300, or both. The receiver 100 may provide the received input data to the processor 200.

The processor 200 may process data stored in the memory 300. The processor 200 may execute computer-readable code (e.g., software in the form of instructions) stored in the memory 300 and instructions induced (generated) by the processor 200.

The processor 200 may be a hardware-implemented data processing device with a circuit that has a physical structure to perform desired operations. For example, the desired operations may include code or instructions in a program.

For example, the hardware-implemented data processing device may include a microprocessor, a central processing unit (CPU), a processor core, a multi-core processor, a multiprocessor, an application-specific integrated circuit (ASIC), and a field programmable gate array (FPGA).

The processor 200 may include an accelerator. The accelerator may include a neural processing unit (NPU), a graphics processing unit (GPU), an FPGA, an ASIC, or an application processor (AP). The accelerator may also be implemented as a computing environment, such as a virtual machine.

The processor 200 may generate an upsampled tensor by copying pixels based on a scale factor for upsampling. The processor 200 may generate the upsampled tensor by referring to an address, in which the pixels are stored, a number of times determined based on the scale factor. The processor 200 may generate the upsampled tensor in a state where a pixel value is not copied in the memory 300, by referring only to the address in which the pixels are stored.

The processor 200 may generate an upsampled tensor by copying the pixels such that a size of a width or a height of the upsampled tensor is the scale factor multiplied by twice (or some other multiple) a width or a height of the data.

The processor 200 may generate a neural network operation result by performing, based on the scale factor, a pooling operation on the upsampled tensor. The neural network operation result may be a result of bilinear upsampling of data based on the scale factor. The pooling operation may include an average pooling operation.

The processor 200 may determine a kernel size of the pooling operation and a padding size of the pooling operation based on the scale factor. The processor 200 may determine the kernel size to be twice the scale factor.

The processor 200 may determine the padding size to be a value obtained by subtracting "1" from the value of the scale factor. The processor 200 may perform padding with a pixel, among the pixels, closest to a padding position, and may do so based on the padding size.

The memory 300 may store instructions (or programs) that are executable by the processor 200. For example, the instructions may include instructions to execute an operation of the processor 200 and/or an operation of each component of the processor 200.

The memory 300 may be implemented as a volatile memory device or a non-volatile memory device.

The volatile memory device may be implemented as dynamic random access memory (DRAM), static random access memory (SRAM), thyristor RAM (T-RAM), zero capacitor RAM (Z-RAM), or twin transistor RAM (TTRAM).

The non-volatile memory may be implemented as electrically erasable programmable read-only memory (EEPROM), flash memory, magnetic RAM (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate memory (NFGM), holographic memory, a molecular electronic memory device, or insulator resistance change memory. For example, the memory 300 may include scratchpad memory (SPM).

The memory 300 may store data for performing a neural network operation. The data for performing a neural network operation may include a model parameter (e.g., a weight) of a neural network or an operand of a neural network operation.

Figure 2:
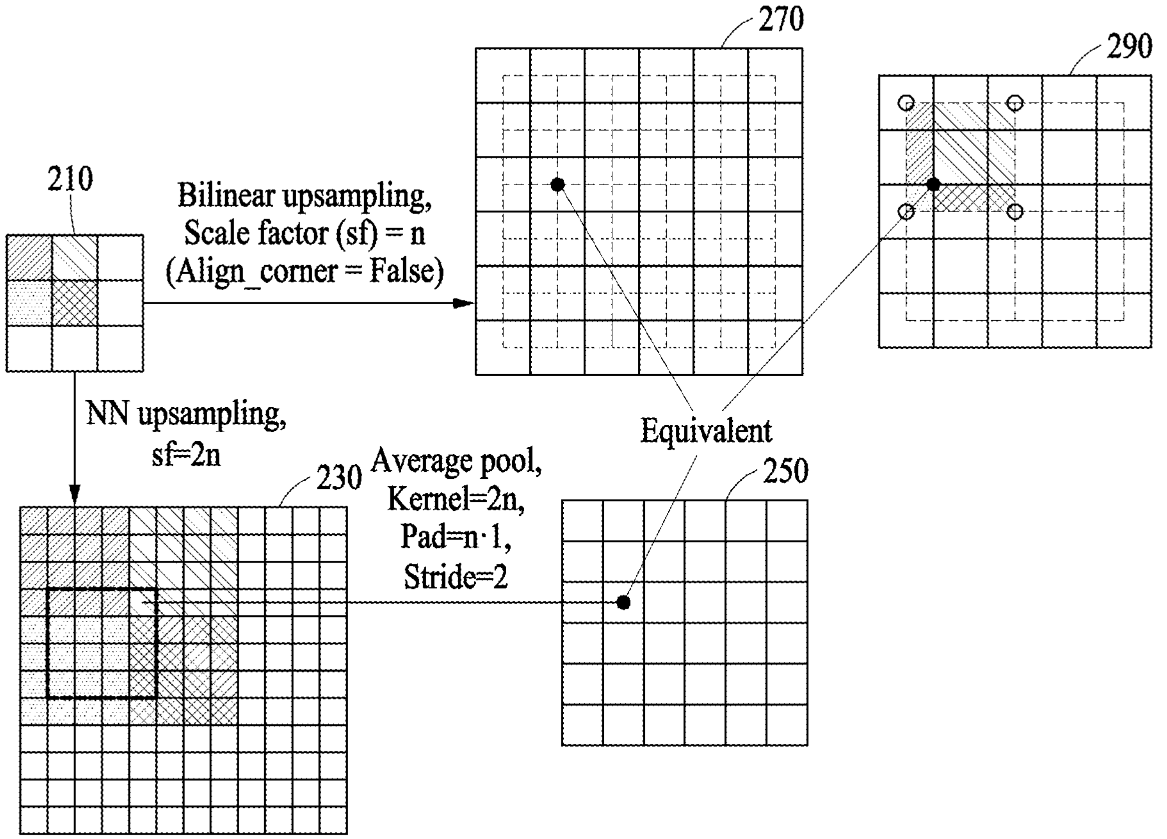
FIG. 2 illustrates an example of an operation of a neural network apparatus, according to one or more embodiments.

FIG. 2 illustrates an example of an operation of a neural network apparatus, according to one or more embodiments.

Referring to FIG. 2, a processor (e.g., the processor 200 of FIG. 1) may perform a neural network operation. The neural network operation may include an upsampling operation, as may be helpful if the neural network is a CNN, for example. The processor 200 may perform a bilinear upsampling operation for the upsampling operation. The processor 200 may perform (effectuate) the bilinear upsampling operation by performing a nearest-neighbor upsampling (hereinafter, referred to as "NN upsampling") and an average-pooling operation.

The processor 200 may perform bilinear upsampling with a scale factor of "n" in two steps. Here, "n" may be a natural number. The processor 200 may perform bilinear upsampling by performing NN upsampling with a scale factor of "2n" and performing an average pooling operation on a result of the NN upsampling. The processor 200 may perform bilinear upsampling by performing an average pooling operation with a kernel size of "2n," a padding size of "n-1," and a stride of "2."

The processor 200 may generate an upsampled tensor 230 by copying pixels of data 210 (e.g., a feature map) based on a scale factor (e.g., "n") for upsampling. The processor 200 may generate the upsampled tensor 230 by referring to an address, in which the pixels are stored, and may do so for a number of times that is determined based on the scale factor.

The processor 200 may generate the upsampled tensor 230 by copying the pixels such that the width or the height of the upsampled tensor is the scale factor multiplied times twice the width or the height of the data (here, the upsampled tensor 230 does not include padding, discussed below).

The processor 200 may generate a neural network operation result 250 by performing, based on the scale factor, a pooling operation on the upsampled tensor 230. The neural network operation result may be a bilinear upsampling of the data based on the scale factor. The pooling operation may include an average pooling operation.

The processor 200 may determine, based on the scale factor, a kernel size of the pooling operation and a padding size of the pooling operation. The processor 200 may determine the kernel size to be twice a value of the scale factor (e.g., "2n").

The processor 200 may determine the padding size (e.g., "n-1") to be a value obtained by subtracting "1" from the value of the scale factor. Based on the padding size, the processor 200 may perform padding with a pixel closest to a padding position.

The processor 200 may perform NN upsampling and an average pooling operation in stages to generate an operation result generally equivalent (or comparable) to a result of bilinear upsampling 270 or 290 that would be generated by directly applying a bilinear upsampling operation to input data.

The processor 200 may efficiently perform a neural network operation by performing bilinear upsampling using NN upsampling and an average pooling operation. If an accelerator does not directly support bilinear upsampling but supports average pooling, the processor 200 may perform bilinear upsampling using the average pooling of the accelerator. In other words, the processor 200 may efficiently perform a bilinear upsampling operation using a hardware device that is optimized for an average pooling operation.

Figure 3:
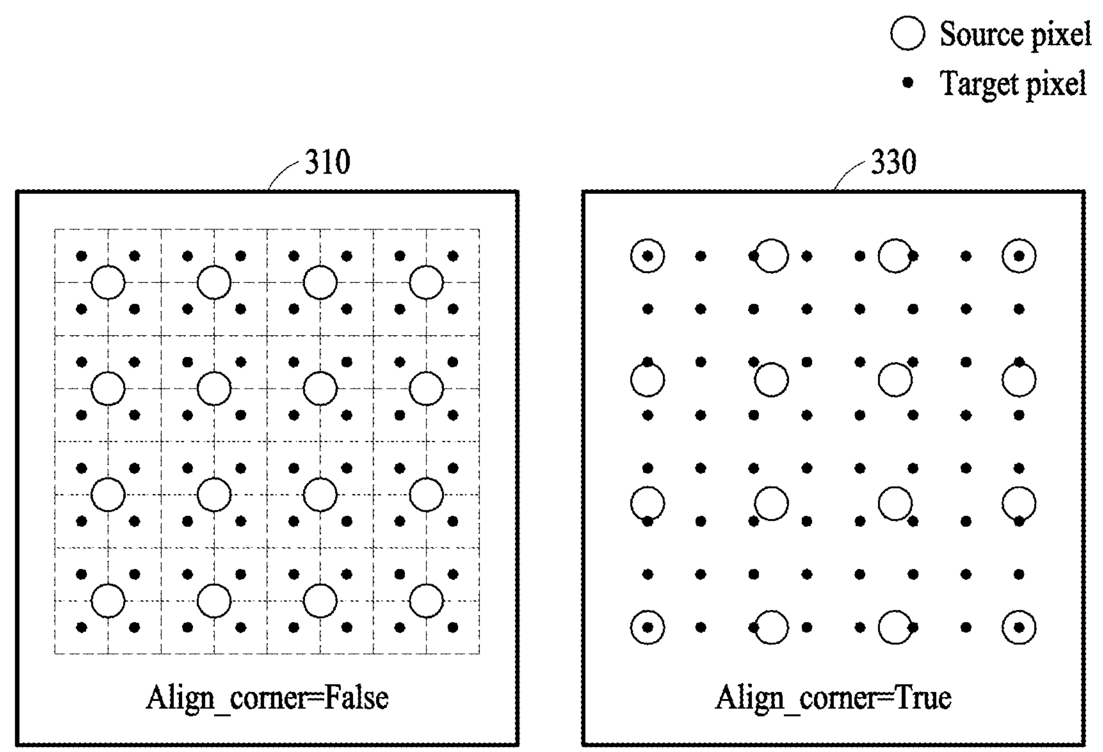
FIG. 3 illustrates an example of bilinear upsampling operation, according to one or more embodiments.

FIG. 3 illustrates an example of bilinear upsampling, according to one or more embodiments.

Referring to FIG. 3, a processor (e.g., the processor 200 of FIG. 2) may generate a neural network operation result (e.g., a result of bilinear upsampling). The processor may generate a result equivalent (or comparable) to the result of bilinear upsampling by performing NN upsampling and an average pooling operation.

The processor 200 may have a two-dimensional tensor input and may generate a two-dimensional tensor as a corresponding output. The processor 200 may determine the size of an output result of NN upsampling according to a scale factor of the bilinear upsampling that is to be performed. If the scale factor to be obtained by bilinear upsampling is "n," an operation result of NN upsampling may have data of size "$n^2$".

The processor 200 may perform NN upsampling on an input tensor with a scale factor of "2n". The processor 200 may perform an average pooling operation on a tensor produced by the NN upsampling, e.g., an intermediate tensor. Here, a size of the kernel used to perform the average pooling operation may be "2n," a padding size of the average pooling operation may be "n-1," and a stride of the average pooling operation may be "2."

The processor 200 may use NN upsampling and an average pooling operation to generate a tensor that is the same as (or comparable to) a tensor generated by performing bilinear upsampling with a scale factor of "n." The processor 200 may generate an operation result that is the same as (or comparable to) a result of bilinear upsampling by taking advantage of the fact that, in general, when performing average pooling, many values of nearby pixels are included in a kernel and relatively few values of distant pixels are included in the kernel.

The example of FIG. 3 illustrates example forms of an output tensor when a scale factor is "2." A tensor generated as a result of bilinear upsampling may have a form of an output tensor 310 in which an alignment of corner pixels is false and an output tensor 330 in which an alignment of corner pixels is true. For example, an output tensor and an input tensor that the processor 200 generated by performing the above operations may have a form in which corner pixels are not aligned. In other words, the processor 200 may generate the output tensor 310 in which an alignment of corner pixels is false. In this example, four ("22") output pixels (e.g., target pixels) may be formed around an input pixel (or a source pixel). In the case of corner alignment being true, the source pixels are aligned on the corners of the tensor. In the case of corner alignment being false, the source pixels may be at centers of respective quads (or larger) of target pixels.

Figure 4:
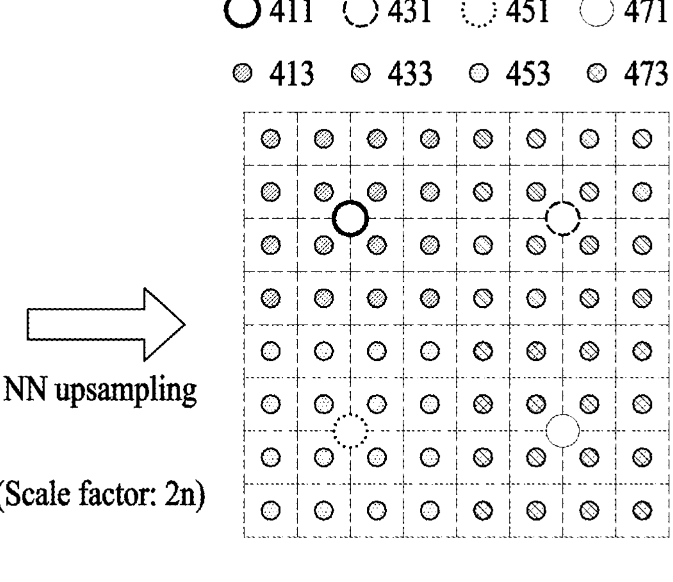
FIG. 4 illustrates of nearest neighbor upsampling, according to one or more embodiments.
Figure 5:
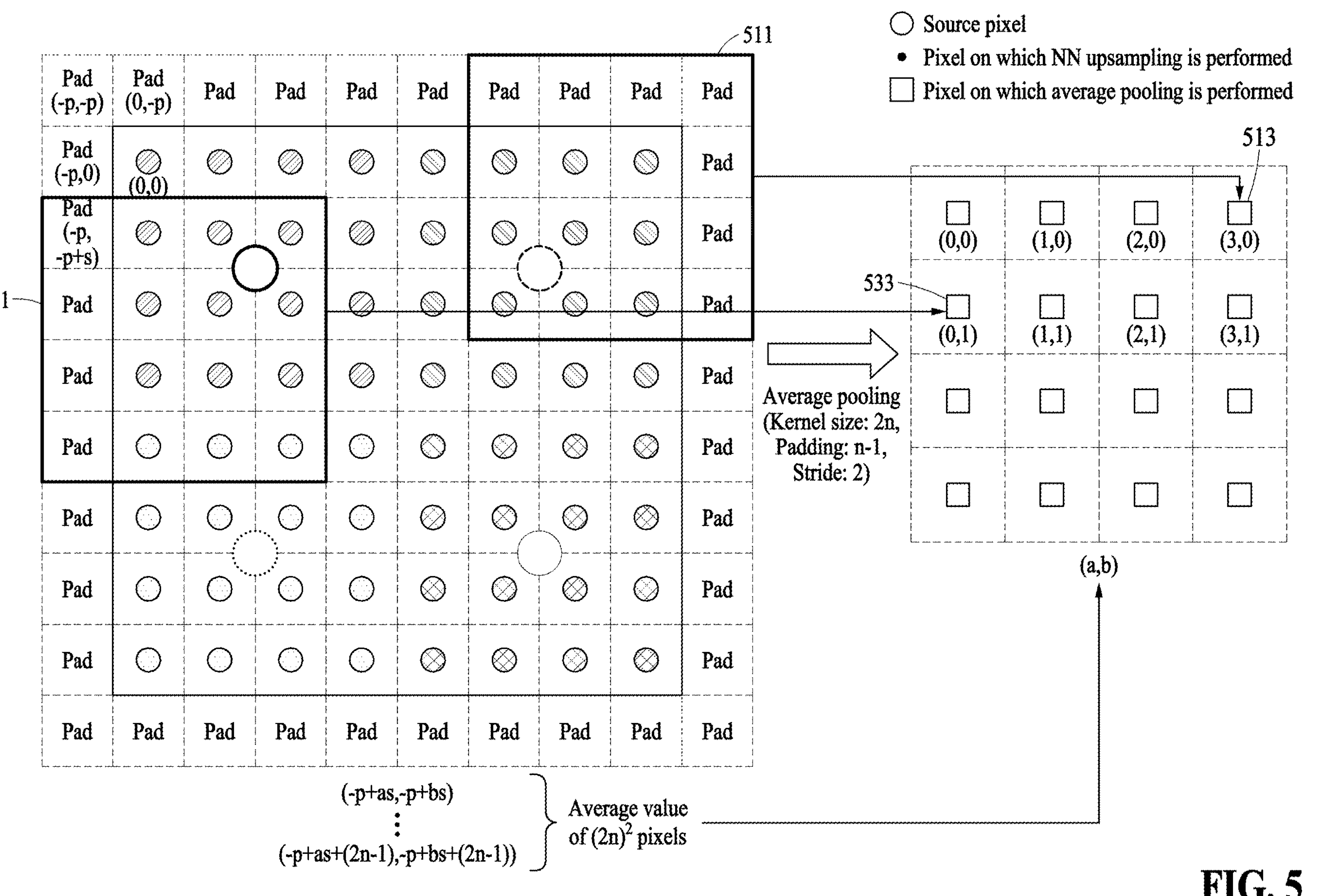
FIG. 5 illustrates an example of a pooling operation, according to one or more embodiments.

FIG. 4 illustrates an example of NN upsampling and FIG. 5 illustrates an example of a pooling operation, according to one or more embodiments.

Referring to FIGS. 4 and 5, the processor 200 may generate an upsampled tensor by copying pixels from a unit of input data (e.g., a tensor, image, feature map, etc.) based on a scale factor of the upsampling. The processor 200 may generate the upsampled tensor by copying the pixels so that the size of the width or the height of the upsampled tensor is twice the size of the width or the height of the input data, times the scale factor.

Examples of FIGS. 4 and 5 illustrate a case where input data is a 2D tensor having a form of 2×2 units (e.g., squares) of source pixels (an example of which is shown in FIGS. 4 and 5). The processor 200 may perform bilinear upsampling with a scale factor of "2" (n="2") on the input data. The 2×2 unit of input tensor data may include four source pixels, for example, source pixels 411, 431, 451, and 471.

The processor 200 may generate an upsampled tensor by performing NN upsampling on the 2×2 units of input tensor data. The upsampled tensor may consist of 8×8 units of tensor data. The upsampled tensor may include target pixel groups 413, 433, 453, and 473.

The processor 200 may generate the target pixel group 413 by copying the source pixel 411, may generate the target pixel group 433 by copying the source pixel 431, may generate the target pixel group 453 by copying the source pixel 451, and may generate the target pixel group 473 by copying the source pixel 471.

The processor 200 may generate, based on the scale factor, a neural network operation result by performing a pooling operation on the upsampled tensor. The neural network operation result may, in effect, be a result of bilinear upsampling of the data based on the scale factor. The pooling operation may include an average pooling operation, although other forms of pooling may be used.

In the example of FIG. 5, a kernel size may be "4" ("2n"), a padding size may be "1" ("n-1"), and a stride size may be "2." The processor 200 may fill padding regions of the NN-upsampled tensor with values of corresponding closest pixels.

The processor 200 may generate pixel 513 (a target of average pooling) by performing average pooling on pixel values corresponding to a kernel 511. The processor 200 may generate pixel 533 (another target of average pooling) by performing average pooling on pixel values corresponding to a kernel 531.

When a top left padding of a 2D tensor on which NN upsampling is performed is set to (−p, −p)=(−1, −1), the processor 200 may generate a pixel (a, b) (on which average pooling is being performed) by calculating an average value of pixels (−1+a*2, −1+b*2), . . . , (2+a*2, 2+b*2).

In the example of FIG. 5, the processor 200 may generate a 4×4 unit of tensor data as a neural network operation result by performing average pooling on an 8×8 unit of tensor data in the upsampled tensor. The generated 4×4 unit of tensor data may be the same as a result of bilinear upsampling of the 2×2 unit of input tensor data.

Figure 6:
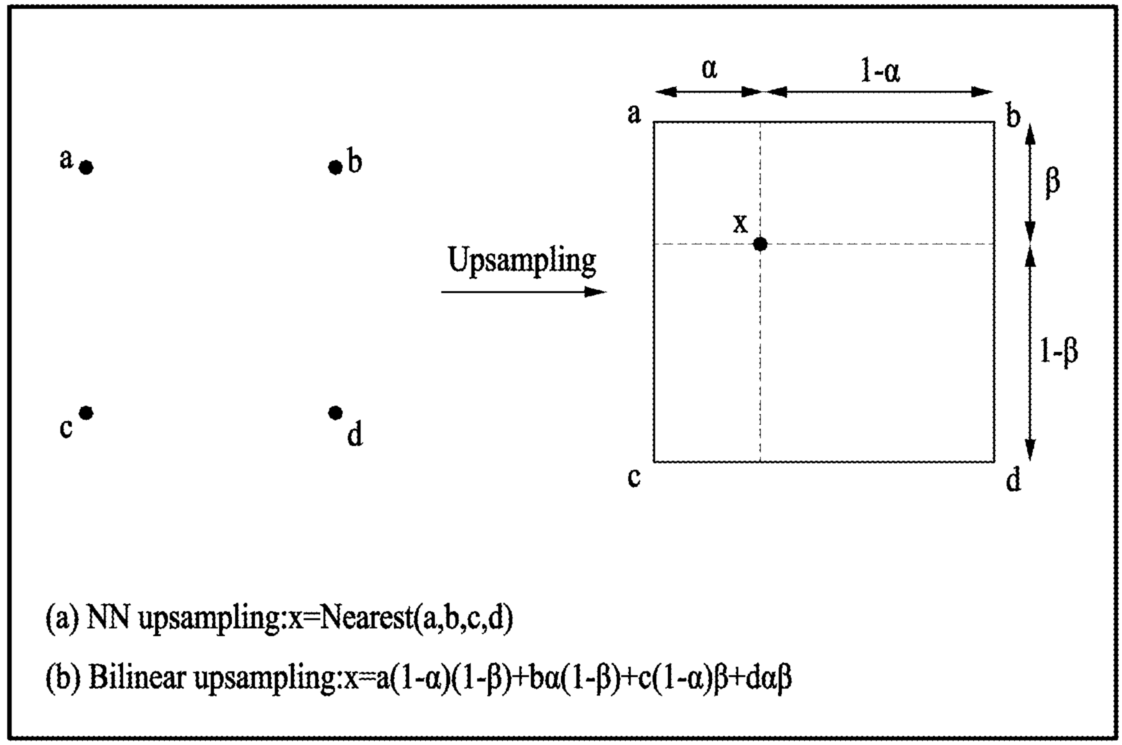
FIG. 6 illustrates an example of a difference in a result of bilinear upsampling, according to one or more embodiments.

FIG. 6 illustrates an example of a difference in a result of bilinear upsampling, according to one or more embodiments.

Referring to FIG. 6, a processor (e.g., the processor 200 of FIG. 2) may perform a neural network operation using a pixel value with a fixed point. A naïve bilinear upsampling method may involve simply multiplying four neighboring source pixels by a weighted value and calculating a sum.

The processor 200 may generate a non-naïve bilinear upsampling result by performing average pooling on pixels on which NN upsampling has been performed. The processor 200 may calculate an average by calculating a sum of pixel values and dividing the sum by a number of the pixels. Accordingly, a result of a neural network operation calculated by the processor 200 may be different from a result obtained using the naïve bilinear upsampling method.

If data used for a neural network operation has an 8-bit fixed point, the processor 200 may generate a bilinear upsampling result with a scale factor of "2" as in Equation 1 below.

$$\frac{(9a+3b+3c+d)}{16} \qquad \text{Equation 1}$$

In Equation 1, a, b, c, and d denote pixel values. If the last "4" bits of a, b, c, and d are "0001" after an operation of Equation 1 is performed, performing addition "16" times may result in "0000" as the last "4" bits of the addition result. A fifth bit may be added by "1" bit due to the carry.

Since multiplication is carried out first, when bilinear upsampling is performed using the naïve bilinear upsampling method, "1" of the last bits may disappear from the last "4" bits due to a right shift "4." Therefore, a slight error may occur between a result of bilinear upsampling performed by the processor 200 and a result obtained using a naïve bilinear upsampling method.

Figure 7:
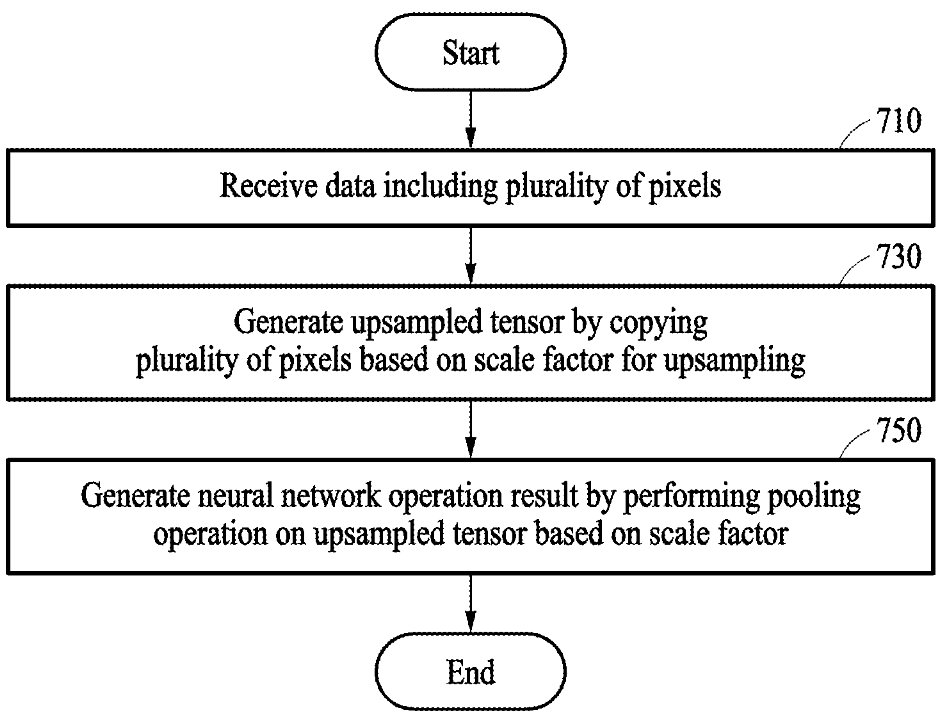
FIG. 7 illustrates an example neural network apparatus, according to one or more embodiments.

FIG. 7 illustrates an example of a neural network apparatus, according to one or more embodiments.

Referring to FIG. 7, in operation 710, a receiver (e.g., the receiver 100 of FIG. 1) may receive data including pixels. The data may include a feature map in which the pixels is arranged in at least 2D.

In operation 730, the processor 200 may generate an upsampled tensor by copying pixels based on a scale factor for upsampling. The processor 200 may generate the upsampled tensor by referring to an address, in which a plurality of pixels is stored, a number of times determined based on the scale factor.

The processor 200 may generate an upsampled tensor by copying a plurality of pixels so that the size of the width or the length of the upsampled tensor is a value obtained by multiplying the size of the width or the length of the data by twice a value of the scale factor.

In operation 750, the processor 200 may generate a neural network operation result by performing a pooling operation on the upsampled tensor based on the scale factor. The neural network operation result may be a result of bilinear upsampling of the data based on the scale factor. The pooling operation may include an average pooling operation.

The processor 200 may determine a kernel size of the pooling operation and a padding size of the pooling operation based on the scale factor. The processor 200 may determine the kernel size to be twice a value of the scale factor.

The processor 200 may determine the padding size to be a value obtained by subtracting "1" from the value of the scale factor. The processor 200 may perform padding with a pixel closest to a padding position among the plurality of pixels based on the padding size.

Although upsampling is described as being used to perform a neural network operation, the upsampling techniques described herein may be used on any arbitrary type of data.

The computing apparatuses, the electronic devices, the processors, the memories, the displays, the information output system and hardware, the storage devices, and other apparatuses, devices, units, modules, and components described herein with respect to FIGS. 1-7 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RW, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A neural network operation apparatus that generates a target tensor comprising first pixels having respective first pixel values, the apparatus comprising:

one or more processors; and memory storing instructions configured to cause the one or more processors to approximate a bilinear upsampling of the target tensor by a scale factor by:

generating an upsampled tensor comprising blocks of second pixels having respective second pixel values by performing nearest neighbor (NN) upsampling on the target tensor, the blocks respectively corresponding to the first pixels and having a same dimension, wherein the NN upsampling comprises setting each blocks' second pixel values to the first pixel value of the first pixel corresponding thereto, wherein the dimension of the blocks is proportional to the scale factor; and generating a downsampled tensor comprising third pixels having respective third pixel values by performing a pooling operation of striding a window with a dimension proportional to the scale factor over the upsampled tensor, wherein the strides of the window respectively correspond to the third pixels, wherein for each stride of the window the second pixel values of the second pixels in the window are pooled to generate the third value of the third pixel corresponding to the stride of the window, and wherein the downsampled tensor approximates the bilinear upsampling of the target tensor by the scale factor.

2. The apparatus of claim 1, wherein the target tensor comprises a feature map in which the first pixels are arranged in two dimensions.

3. The apparatus of claim 1, wherein the instructions are further configured to cause the one or more processors to generate the upsampled tensor by copying the first pixel values such that a width or a height of the upsampled tensor is the scale factor times twice a width or a height of the dimension of the blocks.

4. The apparatus of claim 1, wherein the instructions are further configured to cause the one or more processors to generate the upsampled tensor by referring, for a number of times, to an address in which the first pixels are stored, and wherein the number of times that the address is referred to depends on the scale factor.

5. The apparatus of claim 1, wherein the pooling operation comprises an average pooling operation that averages the second pixel values withing the window.

6. The apparatus of claim 1, wherein the instructions are further configured to cause the one or more processors to determine, based on the scale factor, a kernel size of the pooling operation and a padding size of the pooling operation.

7. The apparatus of claim 6, wherein the instructions are further configured to cause the one or more processors to determine the kernel size to be twice a value of the scale factor.

8. The apparatus of claim 6, wherein the instructions are further configured to cause the one or more processors to determine the padding size to be a value obtained by subtracting "1" from the value of the scale factor.

9. The apparatus of claim 6, wherein the instructions are further configured to cause the one or more processors to perform padding with a first pixel, among the first pixels, closest to a padding position and based on the padding size.

10. A neural network operation method that generates a target tensor comprising first pixels, the method comprising:

receiving the target tensor;

generating an upsampled tensor comprising blocks of second pixels having respective second pixel values by performing nearest neighbor (NN) upsampling on the target tensor, the blocks respectively corresponding to the first pixels and having a same dimension, wherein the NN upsampling comprises setting each blocks' second pixel values to the first pixel value of the first pixel corresponding thereto, wherein the dimension of the blocks is proportional to the scale factor; and generating a downsampled tensor comprising third pixels having respective third pixel values by performing a pooling operation of striding a window with a dimension proportional to the scale factor over the upsampled tensor, wherein the strides of the window respectively correspond to the third pixels, wherein for each stride of the window the second pixel values of the second pixels in the window are pooled to generate the third value of the third pixel corresponding to the stride of the window, and wherein the downsampled tensor approximates a bilinear upsampling of the target tensor by the scale factor.

11. The method of claim 10, wherein the data target tensor comprises a feature map in which the first pixels are arranged in two dimensions.

12. The method of claim 10, wherein the upsampled tensor is generated by copying the first pixel values such a width or height of the upsampled tensor is the scale factor times twice the width or height of the target tensor.

13. The method of claim 10, wherein the pooling operation comprises an average pooling operation.

14. The method of claim 10, wherein the generating of the upsampled tensor comprises determining a kernel size of the pooling operation and a padding size of the pooling operation.

15. The method of claim 14, wherein the determining of the kernel size of the pooling operation and the padding size of the pooling operation comprises determining the kernel size to be twice a value of the scale factor.

16. The method of claim 14, wherein the determining of the kernel size of the pooling operation and the padding size of the pooling operation comprises determining the padding size to be a value obtained by subtracting "1" from the value of the scale factor.

17. The method of claim 14, wherein the generating of the upsampled tensor further comprises performing padding with a first pixel, among the first pixels, closest to a padding position based on the padding size.

18. A method performed by an accelerator device, the method comprising:

as part of performing a neural network operation, generating a target tensor comprising first pixels having respective first pixel values;

generating an upsampled tensor comprising a grid of blocks respectively corresponding to the first pixels, the blocks having a same block dimension value, wherein each block consists of second pixels having respective second pixel values, wherein each blocks' second pixel values are set to the first pixel value of the first pixel corresponding thereto, and wherein the block dimension value is a multiple of a scale factor that is two or more; and generating a downsampled tensor comprising third pixels respectively corresponding to strides of a window strode over the upsampled tensor, wherein for each stride of the window the second pixel values of the second pixels in the window are pooled to generate the third value of the third pixel corresponding to the stride of the window, and wherein the downsampled tensor approximates a bilinear upsampling of the target tensor according to the scale factor.

19. The method of claim 18, wherein the block dimension value is a value of a height or width of the blocks and is twice the scale factor, and wherein the pooling comprises determining an average of the second pixel values of the second pixels within the window.

* * * * *